United States Patent Office.

JAMES HENDERSON, OF BELLEFONTE, PENNSYLVANIA.

PROCESS OF MANUFACTURING IRON AND STEEL.

SPECIFICATION forming part of Letters Patent No. 283,483, dated August 21, 1883.

Application filed July 25, 1883. (No specimens.)

*To all whom it may concern:*

Be it known that I, JAMES HENDERSON, of Bellefonte, Centre county, Pennsylvania, have invented a new and useful Process in the Manufacture of Iron and Steel, of which the following is such full, clear, and exact specification as will enable others skilled in the art to understand and practice the same.

This invention has for its object the more economical production of iron and steel by exposing it to a homogeneous oxidizing-flame, which also contains the elementary constituents of water when the iron is treated with one or more basic reagents.

In application for Letters Patent filed on or about November 6, 1882, No. 87,393, I have described a furnace, &c., and process for making iron and steel without aid of solid reagents; also in Letters Patent No. 267,525, of November 14, 1882, I have described a furnace and the manner of operating the same. In application filed July 11, 1881, No. 37,559, I have described a process for treating iron and steel, of which this is a division.

This my invention consists in producing and regulating the flame in such manner as to produce a homogeneous flame by the combustion, with air, of at least one-third the volume of hydrogen to two-thirds the volume of carbonic oxide, and using this flame in the furnace in connection or combination with basic reagents, or by melting wrought-iron with cast-iron and one or more basic reagents.

Some of the advantages of this my improvement consist in reducing the time of the operation from one-half to two-thirds of that usually employed, with a corresponding saving of fuel, labor, and waste.

In carrying out this my invention I prefer to use a gas producer and furnace, as shown in Letters Patent granted me No. 282,315, dated July 31, 1883.

The preferred mode of operating is to charge the reagents upon a lining of magnesian lime or other suitable basic material; but silicious linings may be used when the metal is pure, or nearly so, or it is not required to remove phosphorus. The iron to be treated may be crude iron, or iron which has been wholly or partially desiliconized, or crude iron mixed with iron or steel, or liquid decarbonized iron from any converter, furnace, or process. These irons may be charged in a solid or liquid state. The reagents are preferably oxide of iron and fluor-spar, or oxide of iron alone, or oxide of iron with lime, or lime alone, or what are generally known as "basic reagents" used in the refining of iron. These reagents are applied to the iron in any known manner, either by charging on the bottom of the furnace before charging the metal, or charging into the metal after the metal is melted on the hearth. The flame impinges upon the charge on the hearth of the furnace and causes chemical action to take place, which action, by reason of the homogeneous flame and the constituents of it, is more energetic than when carried on by processes known before this invention. The action of this flame upon the iron before silicious slags are formed removes a portion of the phosphorus. The homogeneous flame and the basic reagents combine in chemical action and remove the impurities from the iron in a shorter time than is possible with any other flame.

The steely property and the removal of "red-shortness" may be obtained by adding spiegeleisen or ferro-manganese or other compound of iron, carbon, and manganese after desiliconization is effected, as described in application No. 37,559 made by me for Letters Patent on or about July 11, 1881, or after decarbonization in cases where the metal does not contain sufficient manganese after decarbonization to effect these objects without it.

In order that the gases may be properly burned before impinging upon the iron, it is necessary, in order to produce the best effect, that they should be composed of at least one-third volume of hydrogen to the carbonic oxide in admixture with the gases. The hydrogen is preferably obtained by injecting superheated steam, as hereinbefore described.

If desired, the metal after decarbonization may be balled up and squeezed, or hammered and rolled, as in the hand-puddling process; but in this case, if the iron is to be purified of phosphorus, the lining of the furnace must be composed of one or more of the basic materials previously mentioned—such as oxide of iron, lime, magnesian lime, or magnesia—which, if necessary, may be mixed with a small portion of fire-clay. Other kinds of fuel may be employed—such as natural gases from gas-wells or gases that are produced from the heating and distillation of solid fuel, or volatilization of liquids or liquid hydrocarbons, or which may be produced artificially by the action of steam or fuel—which will contain sufficient hydrogen to give about the relative proportions of hydrogen to carbon, hereinbefore described, applied in admixture with air to produce complete combustion and to impinge on the metal. In such application of gases I prefer to first store the gases after production in a suitable receptacle so arranged as to give as nearly as possible a uniform pressure to the gases. The air may also be pumped into a similar receptacle, and the air and gases conveyed by separate pipes to the place of combustion. The pipes may be arranged with gas-regulators in them, so that the pressure of gas at the outlet may be always uniform; or the gases may be pumped from the reservoir by apparatuses similar to those hereinbefore described for supplying air to produce the gases, and sufficient air may be pumped by another apparatus in sufficient amount to effect the complete combustion of the gases. In such cases the blast machine or cylinder should be inclosed in a chamber connected by a conduit with the reservoir, so that the gas will flow from the reservoir to the chamber. This gas so stored may be introduced in the neck of the furnace and burned therein, in place of the gas from the gas-producer.

I do not wish to be understood as limiting myself to any special form of gas-producer, as any gas-producer that will furnish the carbonic oxide and hydrogen in the requisite proportions, and preferably at least one-third volume of hydrogen (more is no disadvatage) to two-thirds of carbonic oxide, will answer the purpose when used in connection with an open hearth provided with suitable appliances, whereby the gas may be intimately mixed with the proper amount of air, so as to produce a substantially homogenous flame before it impinges upon the metal.

I do not claim the use of carbonic oxide and hydrogen gases, broadly, in the manufacture of iron and steel.

What I claim, and desire to secure by Letters Patent, is—

1. The process of purifying metal in the manufacture of iron and steel, which consists, first, in confining the melted metal (whether crude iron or iron that has been desiliconized) in a suitable chamber with a basic reagent; secondly, in the combustion of gaseous fuel, containing carbon and hydrogen, by the admission of air thereto in quantity properly regulated to produce complete combustion and a homogeneous flame previous to its admission to said chamber; thirdly, in causing the homogeneous flame to impinge upon the metal in said chamber, all substantially as described, to produce the purification of the metal.

2. The process of purifying metal in the manufacture of iron and steel, which consists, first, in confining the melted metal (whether crude iron or iron that has been desiliconized) in a suitable chamber with a basic reagent; secondly, in the combustion of gaseous fuel, containing carbon and hydrogen, by the admission of air thereto in quantity properly regulated to produce complete combustion and a homogeneous flame previous to its admission to said chamber; thirdly, in causing the homogeneous flame to impinge upon the metal in the said chamber; and, fourthly, in recarbonizing the metal by the use of a compound of iron, carbon, and manganese, all substantially as described.

3. The process of purifying metal in the manufacture of iron and steel, which consists, first, in confining the metal (whether crude iron or iron that has been desiliconized) in a chamber lined with a basic material, with a basic reagent; secondly, in the combustion of gaseous fuels, containing carbon and hydrogen, by the admission of air thereto in quantity properly regulated to produce complete combustion and a homogeneous flame previous to its admission to said chamber; thirdly, in causing the homogeneous flame to impinge upon the metal in said chamber, all substantially as described.

4. The process of purifying metal in the manufacture of iron and steel, which consists, first, in confining the metal (whether crude iron or iron which has been desiliconized) in a chamber lined with a basic material, with a basic reagent; secondly, in the combustion of gaseous fuel, containing carbon and hydrogen, by the admission of air thereto in quantity properly regulated to produce complete combustion and a homogeneous flame previous to its admission to said chamber; thirdly, in causing the homogeneous flame to impinge upon the metal in said chamber; and, fourthly, in recarbonizing the metal by the use of a compound of iron, carbon, and manganese, all substantially as described.

JAMES HENDERSON.

Witnesses:
G. G. FRELINGHUYSEN,
JOSEPH J. SULLIVAN.